Oct. 4, 1932.  C. F. GREINER  1,880,246
FENDER TOOL
Filed Sept. 17, 1930   2 Sheets-Sheet 2
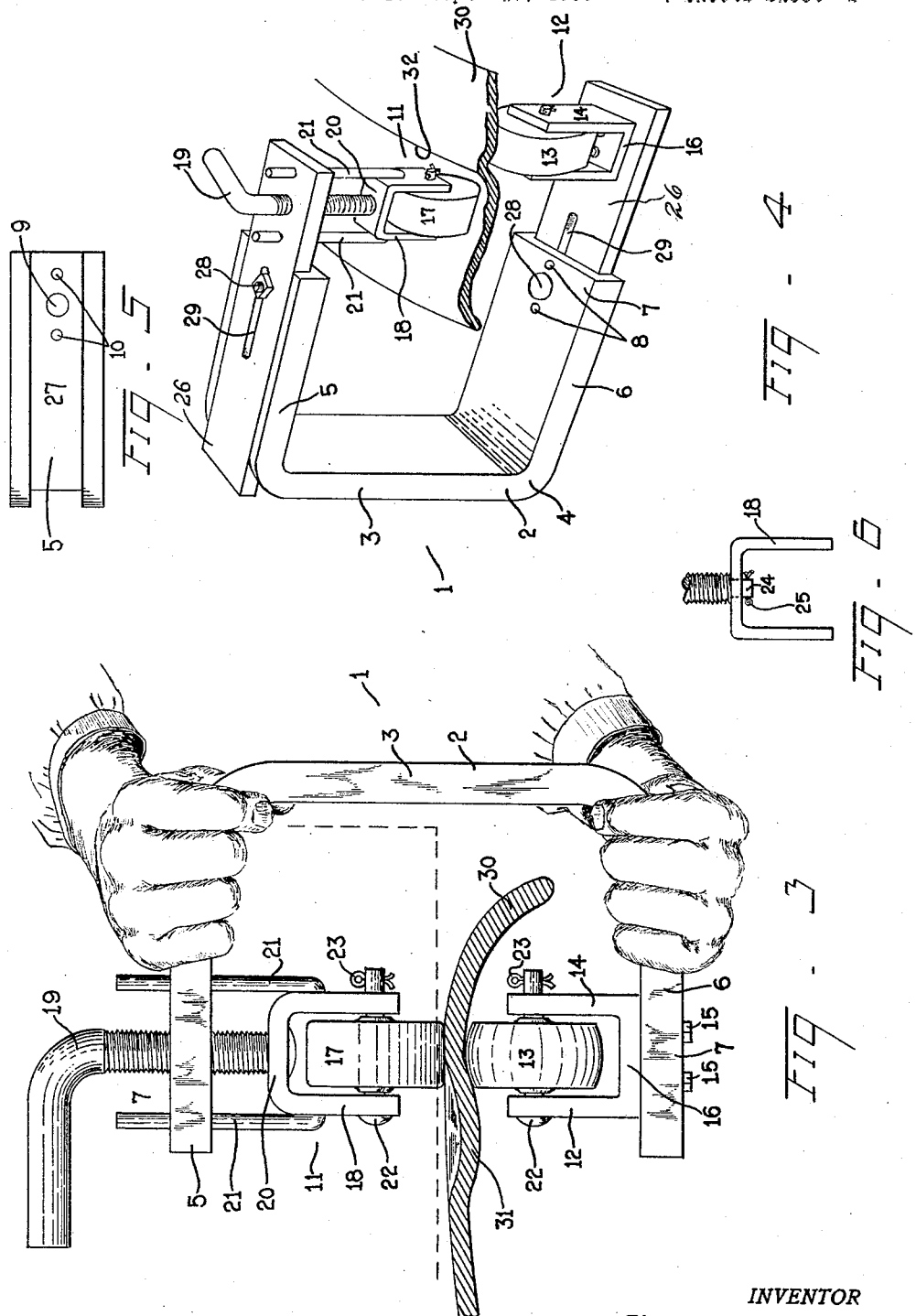
INVENTOR
BY *Charles F Greiner*
ATTORNEY Patented Oct. 4, 1932

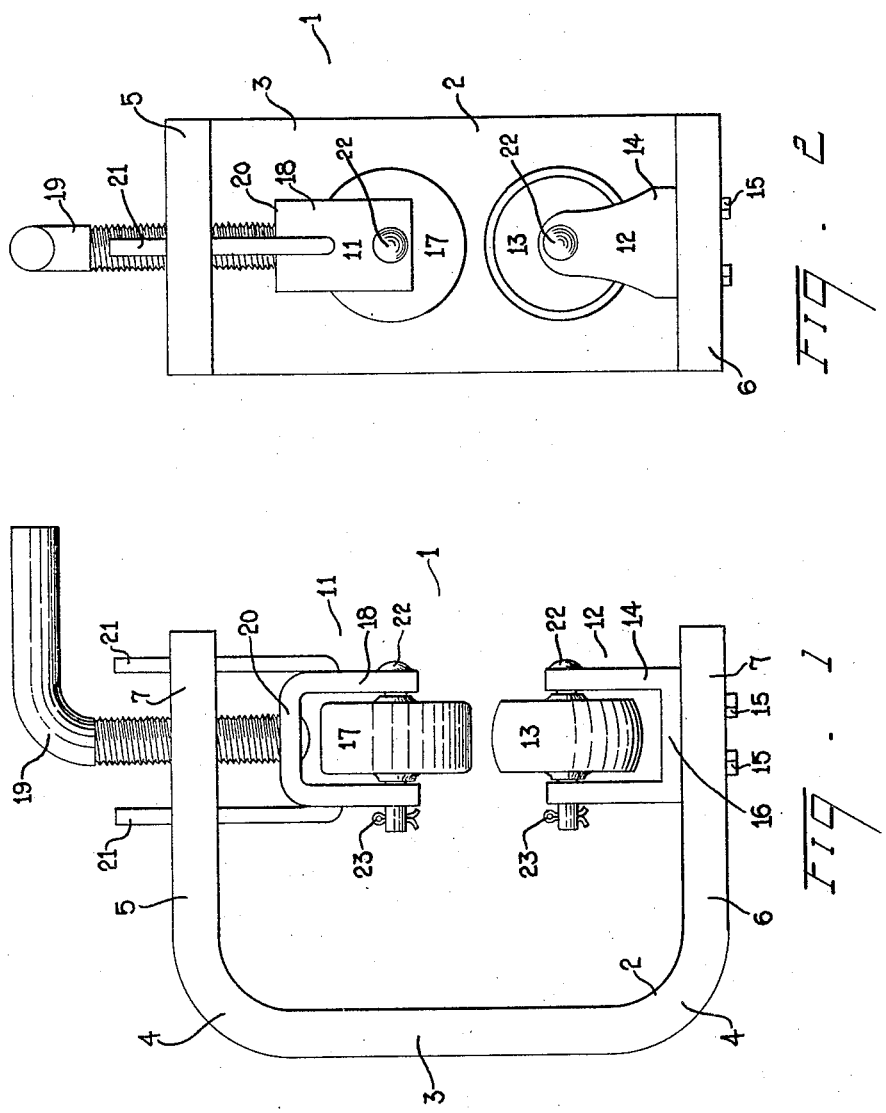

1,880,246

UNITED STATES PATENT OFFICE

CHARLES F. GREINER, OF WALLA WALLA, WASHINGTON

FENDER TOOL

Application filed September 17, 1930. Serial No. 482,499.

This invention relates to fender tools and has as one of its objects to provide a tool that is applicable for use on any fender owing to its flexibility.

Another object of the invention is to provide a fender tool having an offset adjustment and that is expansible.

A further object of the invention is to provide a fender tool that is adapted for universal application and that is exceptionally cheap to manufacture considering its versatility.

A further object of the invention is to provide a fender tool that is adapted for manual manipulation by its size and general construction.

A further object of the invention is to provide a method of straightening fenders consisting of heat treating the fender in place and rolling the deformed fender to restore it to its original shape and hardness.

With these and other objects in view reference is now had to the accompanying drawings in which Fig. 1 is a side elevation of one form of the tool;

Fig. 2 is an end elevation thereof;

Fig. 3 is a side elevation of the tool showing its application and method of manipulation;

Fig. 4 is a perspective view of my preferred form of tool showing its application to a certain form of the work;

Fig. 5 is a plan view of the upper side arm of the frame; and

Fig. 6 is a side elevation of one of the yokes and a fragment of the adjusting handle showing a method of swivel connection.

Having reference to the drawings, like numerals refer to like parts throughout the several views and the numeral 1 refers to the fender tool as a whole which consists of a frame 2, preferably of a single piece of metal bent in U shape and preferably of channel section.

The frame 2 obviously is of substantial material to provide for rigidity, and for the purpose of this description will consist of a straight, vertically positioned base member 3, shaped with short bends 4 to provide an upper side arm 5 and a lower side arm 6, which arms are likewise formed in a straight line but in a position perpendicular to the vertically positioned base member 3 whereby to form a vertical and horizontal guide for said tool.

At the free end 7 of the respective arms, holes 8, 9 and 10 respectively are provided, as shown in Figs. 4 and 5, and these holes are adapted to accommodate roller assemblies 11 and 12 respectively, the lower of the two rollers 13 being revolubly mounted in a yoke 14, in the usual manner of such construction, and adapted to be secured to the lower side arm 6 by means of bolts 15 which pass through the holes 8 of said side arm to enter the base 16 of the yoke 14, whereby to provide for its removal for a purpose to be explained.

The upper side arm 5 is provided with holes 10 positioned similar to the holes 8 of the lower side arm and has a central hole 9 which may be of greater diameter, with these holes being adapted to adjustably receive a second or upper roller 17 which is similarly mounted in a yoke 18 and which is provided with an adjusting handle 19 threadedly engaged in the said holes 9, and for swivel attachment in the base 20 of the said yoke 18, in any suitable manner, and for the purpose of vertically adjusting the said second roller 17, and the yoke 18 is further provided with guide rods 21 which extend upward to pass through the smaller holes 10, shown in Fig. 5.

It is now obvious that by this arrangement both rollers will normally be in direct vertical register and by means of the adjusting handle 19 may be set close together, even to a point of exerting considerable pressure, on any metal or other substance to be rolled therebetween.

The rollers are preferably secured in their respective yokes by means of pins 22 passing therethrough, and through the extended arms of the yokes, and are preferably secured therein by cotter keys 23, all as shown in the drawings, or obviously other means of securement may be employed if desired whereby to interchange said rollers, or substitute rollers of other faces than that shown herewith, and as it is the intent to provide for the removal of the upper roller assembly 11 also the said adjusting handle may be swivelly secured in its yoke in a like manner to that of the said pins, i. e., with pin 24 and cotter key 25, as shown in Fig. 6, while as before mentioned the lower roller assembly will be secured preferably by bolts 15 to enable the readiest removal of this assembly when desired, and for a purpose to be explained.

To complete the device to a stage of my preferred form, the side arms 5 and 6 are made expansible by means of extension arms 26 which contain like and similarly positioned holes to the holes in the side arms, and these extension arms are slidably mounted in the recess 27 of the channeled side arms and are secured therein and in any predetermined position independent of each other by means of suitable securing bolts 28, as shown in Fig. 4.

By this means is provided expansible side arms and means to rigidly secure the extension arms rigidly and longitudinally of said channels.

To provide for ease of manipulation, the securing bolt holes in the side arms are preferably threaded to receive the threaded part of the securing bolts 28 to prevent the nut thereof from binding on the extension arm during its adjustment, and as the pressure against the extension arm is in a direction from the rollers, toward these arms, these said securing bolts 28 are placed toward the free end 7 of the side arms so that the rear end thereof will bear against the ends of the said base member of the frame to frictionally assist in preventing slipping.

For adjustment purposes a slot 29 is provided in each of the extension arms to provide for slidable movement of that member on the securing bolts.

It is now apparent that vertical adjustment may obtain for operation on flat surfaces where it is desired or necessary to roll out kinks or bends, the adjustment being such as to provide for different thicknesses of metal in the fender 30 and according to the work in hand, and with the rollers in absolute or partial register with each other, or by means of the extension arm in offset relation as shown in Fig. 4, in either case and with the frame bent at right angles, the rollers may be properly positioned for the work by aligning the frame with the surface worked upon, by sighting from the work to either the base member which is now perpendicular to that surface, as represented by the broken line in Fig. 3, or obviously bringing the side arm in parallel relation to the work.

In use the larger kinks or indentations 31 are bumped out by a hammer or other tool, as a preliminary to removing the finer indentations by rolling, when the work will be finished by drawing the tool back and forth in a longitudinal direction on the fender and over the said indentations.

By this operation these indentations are raised to the level of the surrounding surface, and in keeping with the original surface, except however that owing to the fact that the denting of the metal of the fender has obviously caused a certain amount of objectionable stretching to occur, which when rolled in the ordinary manner will cause the finished surface to be out of harmony with the surrounding original surface, to a degree noticeable to an observer after the metal has been finished with paint or enamel or the like, that other means will be necessary to provide a perfect job.

The above holds true where the rollers are placed in total or partial relation, or, in offset relation as where removing kinks from the bead 32 of a fender that has become dented, (this last arrangement of the rollers with respect to this work being shown in Fig. 4) and to overcome the effect of this objectionable stretching, in both cases, the fender is heat treated, without removal as a preliminary step to the rolling operation, the heat being applied by a blow torch or other suitable means for applying heat, at either the under side or the outside of the fender, thereby softening the metal which has naturally become hardened to a degree according to the amount of stretching received, thereby permitting the fender to resume its natural form by the operation of said rollers thereon.

It is now plainly evident that a fender tool is provided that has the proper rigidity both by the inherent strength of the channel cross section and by its compact construction, including its relatively short side arms which have a length approximating one half the width of the fender or less, and that by the addition of extension arms the tool is adapted to cover the full surface of the fender.

It is also apparent that where it is necessary to use the tool with the rollers in partial register, which under certain circumstances is desirable, or when a complete offset is desired as before explained, that this may be accomplished by the addition of the extension arms, and further that where the work requires it, the adjustable roller may be retained in its original position in the upper side arm and the lower roller transferred to the lower extension arm for positioning in the offset relation.

Or on the other hand the bottom roller may be rigidly secured to the lower side arm and the upper and adjsutable roller secured in the extension arm to position the rollers in a reverse manner to that above explained.

Having thus described my invention I claim:

1. In a fender tool, a rigid U shaped frame having side arms, an arm expansibly attached to each side arm of said frame and adapted for slidable movement, independent of each other, and rollers mounted in said arms, and adapted for absolute, partial or offset register with each other by the adjustment of each arm.

2. In a fender tool, a rigid U shaped frame, having side arms of channel cross section, an arm expansibly and slidably mounted in the channel of each of the side arms, and adapted for independent adjustment, means to secure said arms in the adjusted position with respect to said side arms, and rollers mounted in said arms and adapted for absolute, partial or offset register with each other.

3. In a fender tool, a rigid U shaped frame, of channel cross section, shaped to provide a straight vertically positioned base member, and side arms perpendicular thereto, an arm slidably mounted in each of the said side arms, means to rigidly secure each of said sliding arms in a predetermined position longitudinally in said channels, a yoke removably secured to one of the said side arms, a second yoke adjustably mounted in the other of said side arms, and rollers operably mounted in said yokes and adapted for absolute, partial or offset register and for operation in a path perpendicular to the position of said frame.

In testimony whereof I affix my signature.

CHARLES F. GREINER.